United States Patent
Bhargava et al.

(10) Patent No.: US 10,963,480 B2
(45) Date of Patent: Mar. 30, 2021

(54) FLEXIBLE CONTENT INTEGRATION

(71) Applicant: SAP SE, Walldorf (DE)

(72) Inventors: Apoorv Bhargava, Bangalore (IN); Madathiveetil Bipin, Bangalore (IN); Markus Schmidt-Karaca, Heidelberg (DE); Ismail Basha, Bangalore (IN); Gonda Marcusse, Kronau (DE); Anthony Arun B, Bangalore (IN); Vishnu Kare, Kurnool (IN); Naveed Mohammed, Bangalore (IN)

(73) Assignee: SAP SE, Walldorf (DE)

( * ) Notice: Subject to any disclaimer, the term of this patent is extended or adjusted under 35 U.S.C. 154(b) by 665 days.

(21) Appl. No.: 15/587,952

(22) Filed: May 5, 2017

(65) Prior Publication Data

US 2018/0322177 A1 Nov. 8, 2018

(51) Int. Cl.
*G06F 16/25* (2019.01)
*G06F 16/84* (2019.01)
*G06F 16/21* (2019.01)

(52) U.S. Cl.
CPC .......... *G06F 16/254* (2019.01); *G06F 16/214* (2019.01); *G06F 16/252* (2019.01); *G06F 16/256* (2019.01); *G06F 16/86* (2019.01)

(58) Field of Classification Search
CPC ....... G06F 16/254; G06F 16/252; G06F 16/86
See application file for complete search history.

(56) References Cited

U.S. PATENT DOCUMENTS

| 2016/0078089 A1* | 3/2016 | Hu ..................... G06F 16/2379 707/714 |
| 2016/0224674 A1* | 8/2016 | Miller ................... G06Q 20/10 |
| 2016/0253364 A1* | 9/2016 | Gomadam .......... G06F 16/3344 707/739 |
| 2017/0337080 A1* | 11/2017 | Manescu ............... G06F 9/5011 |

* cited by examiner

*Primary Examiner* — Grace Park
(74) *Attorney, Agent, or Firm* — Schwegman Lundberg & Woessner, P.A.

(57) ABSTRACT

Methods, systems, and computer program products for a database processing system are described. A core database comprises common procedures for processing information, at least one of the common procedures configured to provide a common functionality to an analysis application. A content import database comprises content-specific procedures, at least one of the content-specific procedures configured to provide access for at least one of the common procedures to content of the content import database that conforms to a content-specific data model.

20 Claims, 13 Drawing Sheets

US 10,963,480 B2

FLEXIBLE CONTENT INTEGRATION

FIELD

The present disclosure relates generally to database processing systems. In an example embodiment, the disclosure relates to a flexible technique for integrating content into a data analysis system.

BACKGROUND

Domain-specific, free-style applications, such as search, have fixed data and content models. Features, such as search, link analysis, geo-map based analysis, connection analysis, event time analysis, and the like, are then designed based on the corresponding models. As a result, each feature (functionality) has a fixed behavior. For example, a search function may only be able to search based on the defined, fixed searchable attributes of the model. Similarly, link analysis may have fixed logic for finding related entities. The fixed behavior leads to a plurality of applications and products with similar or the same features, but different data and content models.

BRIEF DESCRIPTION OF DRAWINGS

The present disclosure is illustrated by way of example and not limitation in the figures of the accompanying drawings, in which like reference numbers indicate similar elements and in which.

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for integrating content into a data analysis system are described. Fixed behavior-based applications with fixed data/content models typically need changes to the application code to process other types of content and provide other types of behaviors. This results in a plurality of applications and products with similar or the same features. It can, however, be cumbersome to change the implementation of an application when a functionality, such as search, needs a different behavior to handle different domain-specific content.

In one example embodiment, a core analysis component utilizing a generic data model provides features and functions having a common (core) behavior. A content-specific behavior component provides access for the core analysis component to content that conforms to a content-specific data model. The common features and functions may be shared by a plurality of applications to access a variety of content that is specific to different domains.

Figure 1A:
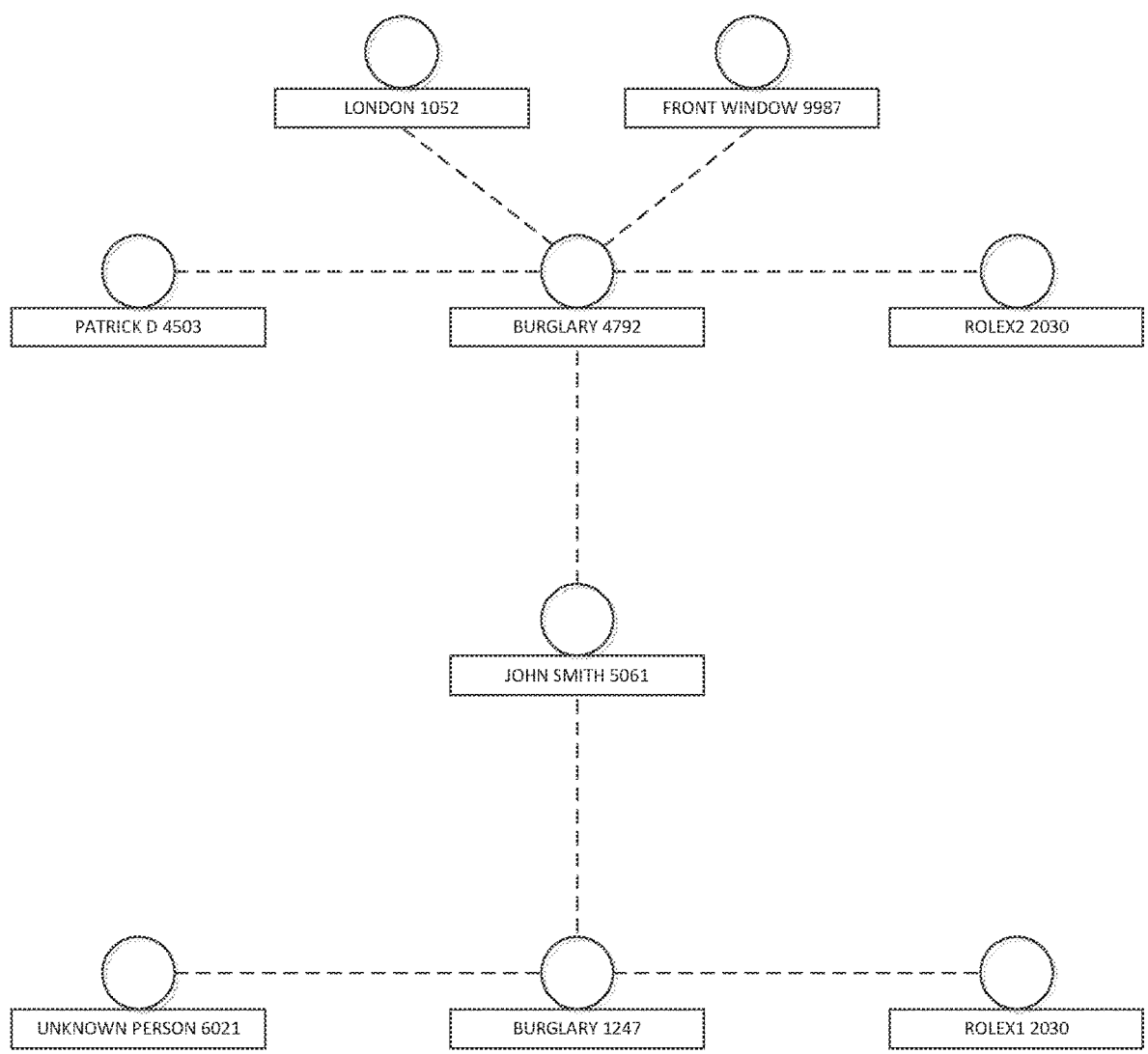
FIG. 1A is a diagram of an example user interface for displaying content accessed from a data analysis system, in accordance with an example embodiment.

FIG. 1A is a diagram of an example user interface for displaying content accessed from a data analysis system, in accordance with an example embodiment. As illustrated in FIG. 1A, nodes represent entities stored in the data analysis system and edges represent relationships among the entities. In one example embodiment, the entities are stored in an entity type table and the relationships are stored in a relationship type table. The content may correspond to a particular domain. For example, the entities displayed in FIG. 1A correspond to information from a police department data record system. As illustrated in FIG. 1A, a burglary 4792 was committed in the city of London 1052 and involved the theft of a Rolex watch 2030. The burglary 4792 was conducted through a front window 9987. The burglary 4792 is associated with an individual named Patrick D. 4503. Selection of the node representing Patrick D. 4503 would reveal that Patrick D. 4503 is the original owner of the Rolex watch 2030. Another burglary 1247 also involved the theft of a Rolex watch 2030. An unknown person 6021 is related to the burglary 1247. Selection of the node representing the unknown person 6021 would reveal that fingerprints were discovered at the scene of the robbery, but have not been connected to a known individual. As illustrated in FIG. 1A, a node 5061 represents that John Smith is connected to both burglaries. Selection of the node 5061 representing John Smith would reveal that John Smith is the main suspect in both robberies.

Figure 1B:
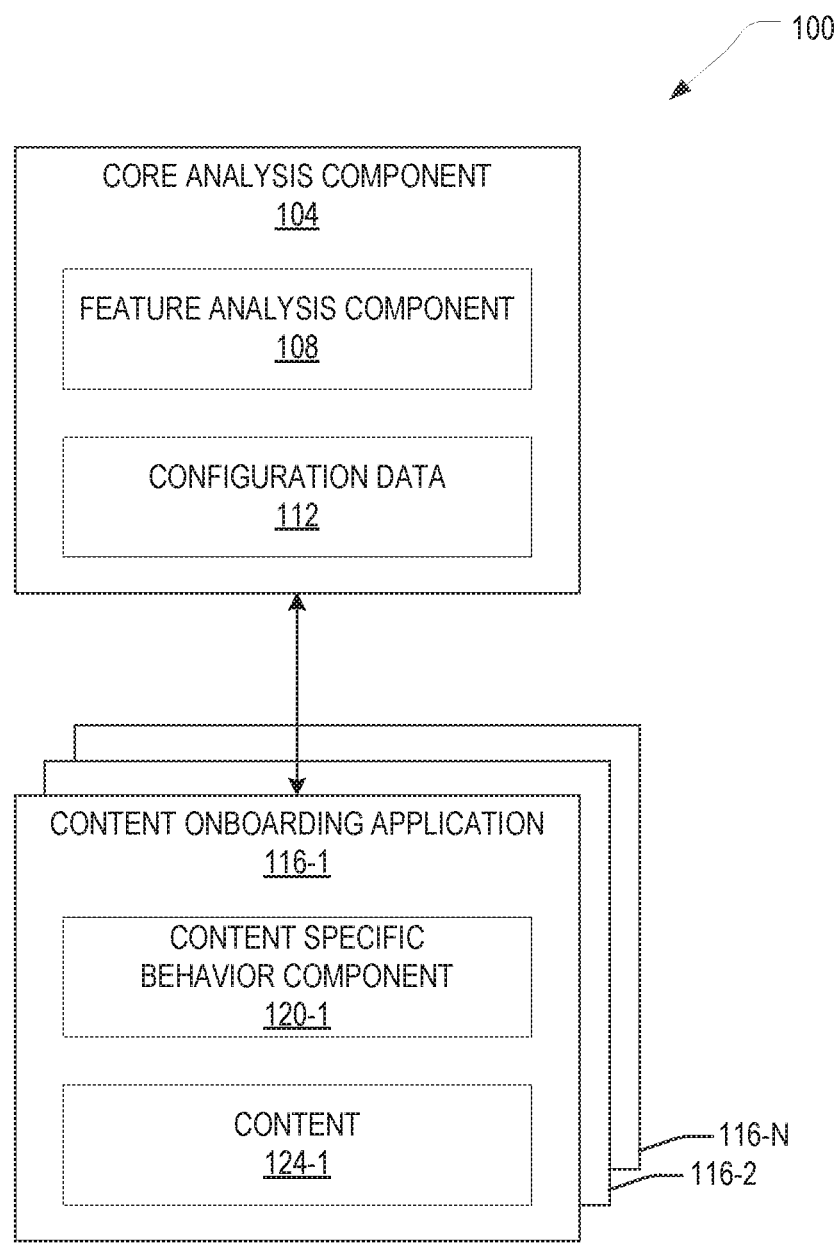
FIG. 1B is a diagram of an example architecture for importing content into a data analysis system, in accordance with an example embodiment.

FIG. 1B is a diagram of an example architecture 100 for importing content into a data analysis system, in accordance with an example embodiment. In one example embodiment, a core analysis component 104 contains a features analysis component 108 that provides common core functions for a plurality of applications. Configuration data 112 configures the core analysis component 104 to interface to content onboarding applications 116-1, . . . , 116-N (collectively known herein as content onboarding applications 116). Each content onboarding application 116 provides for the importing of content from one or more physical source systems, the formatting of the imported content to conform to a content-specific data model, and access for the core analysis component 104 to the content conforming to the content-specific data model. The configuration data 112 also provides for mapping functionality (such as the common core functions of the features analysis component 108) to functionality provided by the content onboarding application 116. For example, a stored procedure, such as a search procedure, may be configured differently for each logical source system. As used herein, a logical source system is a logical representation of the data analysis system for a particular domain, such as a criminal analysis system, an unemployment system, and the like, and acquires content from one or more physical source systems, such as a police department data record system, an unemployment data record system, a crime data record system, and the like. A logical source system may combine data from different physical source systems.

If no content-specific behavior is required for a particular logical source system, a common behavior may be provided by the core analysis component 104. In addition, new content (e.g., new entity types) can be incorporated into the data analysis system using the configuration information of the configuration data 112, as described more fully below by way of example in conjunction with FIG. 2B. For example, if a new entity type called "patient" (that contains a patient's name) is to be introduced into the data analysis system, the new entity type can be defined in the configuration data 112. In addition, new content onboarding applications 116 may be added to the data analysis system and may import a new content-specific model with new entity types, may add a new entity type as a component of an existing content-specific model, or may add new attributes to existing entity types of an existing content-specific model. The configuration data 112 may also be updated with the new entity type to enable, for example, the implementation of a new search filter and other procedures.

Each content onboarding application 116 includes content 124-1, . . . , 124-N (collectively known herein as content 124) and a content-specific behavior component 120-1, . . . , 120-N (collectively known herein as content-specific behavior components 120) that understands the content-specific model of the content 124 associated with the corresponding content onboarding application 116. Each content onboarding application 116 provides access for the core analysis component 104 to the content 124 associated with the corresponding content onboarding application 116. Each content-specific behavior component 120 enables the mapping of the content 124 to the generic data model of the core analysis component 104. In addition, each content-specific behavior component 120 may provide support for particular common core functions of the core analysis component 104. For example, the content-specific behavior component 120-1 may map a search function, such as a search for a particular person that was submitted by the core analysis component 104, to a particular column(s) of a particular table(s) within the content-specific data model of the corresponding content onboarding application 116. In addition, a mapping function may map a generic identification of content provided by the common functionality to a specific instance of content 124 of the content-specific data model. Since the user interface of the data analysis system may support a plurality of languages, the content-specific behavior component 120 may also provide for the translation of data stored in the content 124 to the language specified by, for example, a user interface component.

Figure 2A:
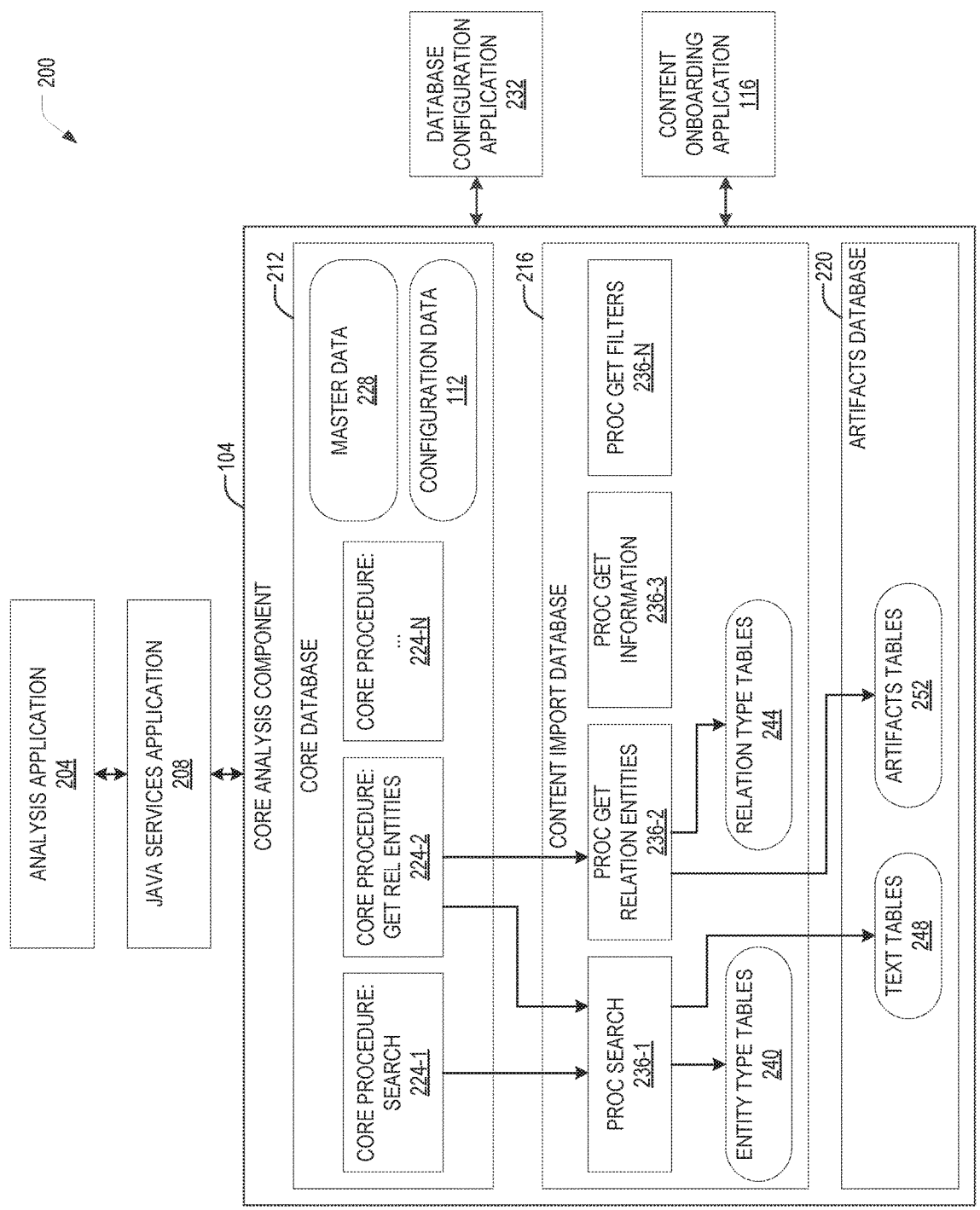
FIG. 2A is a block diagram of a first example data analysis system for importing and analyzing the content, in accordance with an example embodiment.

FIG. 2A is a block diagram of a first example data analysis system 200 for importing and analyzing the content 124, in accordance with an example embodiment. An analysis application 204 and a Java services application 208 utilize the core analysis component 104 to access the content 124 imported from a variety of physical source systems, such as a police department data record system (not shown). The analysis application 204 may provide functions, such as search, link analysis, geo-spatial analysis, timeline-based analysis, and the like, for analyzing the content 124. The Java services application 208 delegates calls from a user interface of the analysis application 204 to stored core procedures 224-1, . . . , 224-N (collectively known herein as core procedures 224) of the core analysis component 104.

The core analysis component 104 includes a core database 212, content import database 216, and an artifacts database 220. The core database 212 stores the core procedures 224, such as a search procedure 224-1, a get relation entities procedure 224-2, and the like, that are common for a variety of analysis applications 204. The core analysis component 104 also includes master data 228 and configuration data 112. The master data 228 includes a master node table and a master relation table, as described more fully by way of example in conjunction with FIG. 4. The core procedures 224, master data 228, and configuration data 112 may be obtained via a database configuration application 232.

Each content onboarding application 116 provides content from a physical source system to the content import database 216 via the core analysis component 104. In one example embodiment, there is one content onboarding application 116 per logical source system. Each logical source system may access entity types defined in different physical source systems. An entity type, as used herein, defines the common attribute(s) of a type of entity. Entities of a particular entity type may be stored in a table of a database where each row of the table corresponds to an entity. For example, a table storing person-related entities may contain entities having the attributes of person identifier, person name, and age. Each entity type may be described by an entity type name and the corresponding list of attributes. Al entity type may also be implemented using a joined view of tables.

In one example embodiment, each logical source system is configured based on the types of data that are obtained from the physical source system(s) and that are to be analyzed together. In one example embodiment, a logical source system identifier is an identifier which is used to map data of a physical source system to a content-specific model during the replication of data from the physical source system to the content import database 216. An identifier may be, for example, a global unique identifier (GUI) of 16 or 32 characters, a unique user-defined identifier, and the like.

In one example embodiment, an explicit configuration is performed. Data is first replicated from a physical source system(s) (based on the identifier(s) of the corresponding physical source system(s)) and the logical source system is prepared by mapping the logical source system to the physical source system identifier(s). For example, data from physical source systems P1, P2, P3 may be replicated using a corresponding physical source system identifier, and a logical source system L1 is created and mapped to the physical source systems P1, P2, and P3. An application can then use this mapping to perform tasks using the logical source system and the replicated data of the physical source systems P1, P2, and P3.

Figure 4:
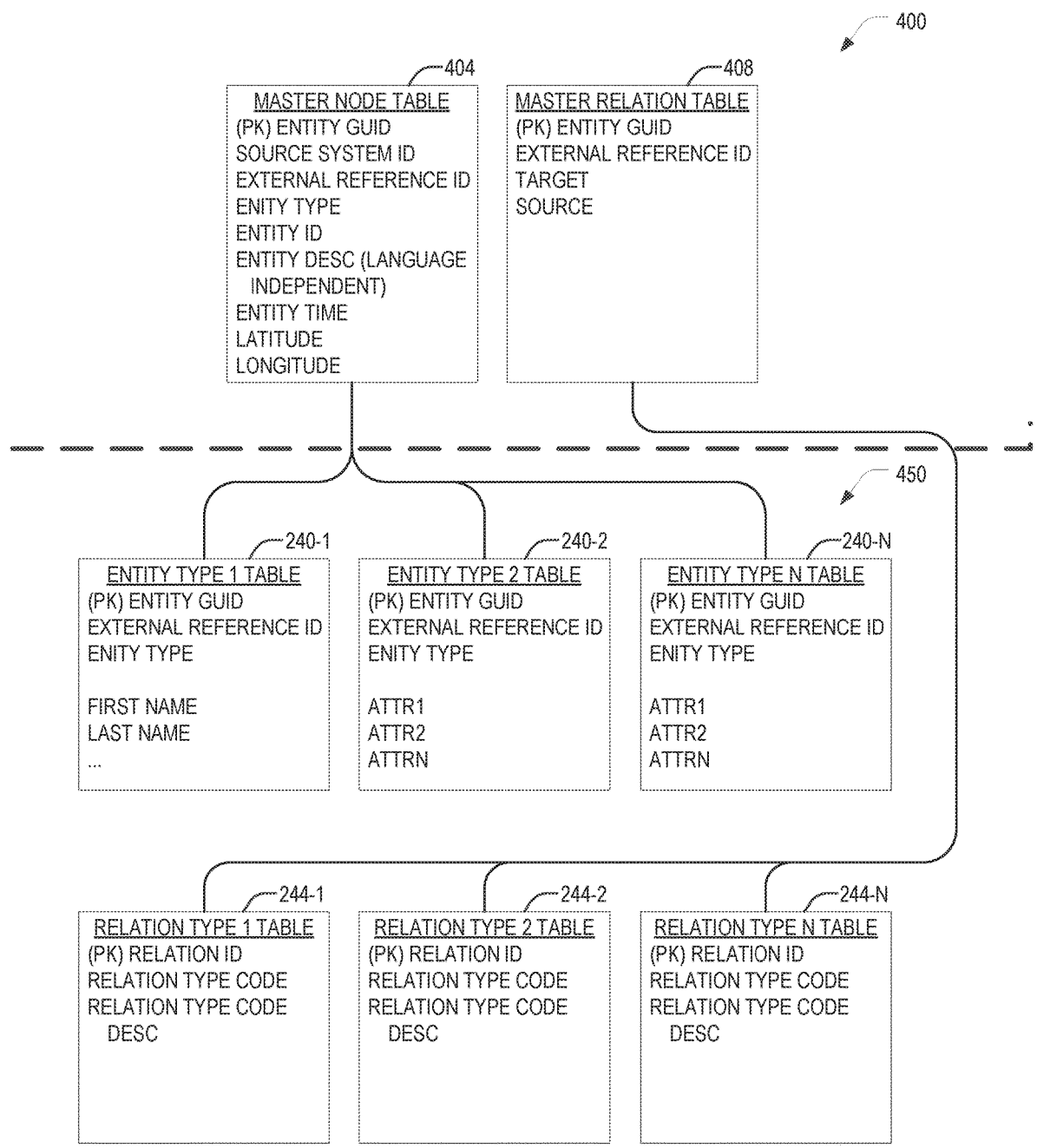
FIG. 4 is a generic diagram of an example generic data model and an example content-specific data model, in accordance with an example embodiment.

The content import database 216 includes data that has been imported and stored in, for example, entity type tables 240 and relation type tables 244, as described more fully by way of example in conjunction with FIG. 4. The content import database 216 also includes stored procedures having content-specific behavior, such as a procedure search 236-1, a procedure get relation entities 236-2, a procedure get information 236-3, and a procedure get filters 236-N (collectively known herein as procedures 236). As described herein, the content-specific behavior component 120-1 may map a search function, such as a search for a particular person that was submitted by the core analysis component 104, to a particular column of a particular table within the content-specific data model of the corresponding content onboarding application 116

The artifacts database 220 includes text tables 248 and artifacts tables 252. The text tables 248 may include data, such as key-value pairs, that may be used for language translation. For example, if the data analysis system 200 supports multiple languages, the text tables 248 may provide information for the translation of entities, attributes, and the like from one language to another language. An indication of the language used by the user interface of the analysis application 204 may flow through the Java services application 208 to the procedures 236 of the content import database 216, which may access the text tables 248 to translate results into the appropriate language. In one example embodiment, the data of the text tables 248 and artifacts tables 252 are common to multiple procedures 236 and may be imported prior to, during, or after the importing of new content via the content onboarding applications 116.

Figure 2B:
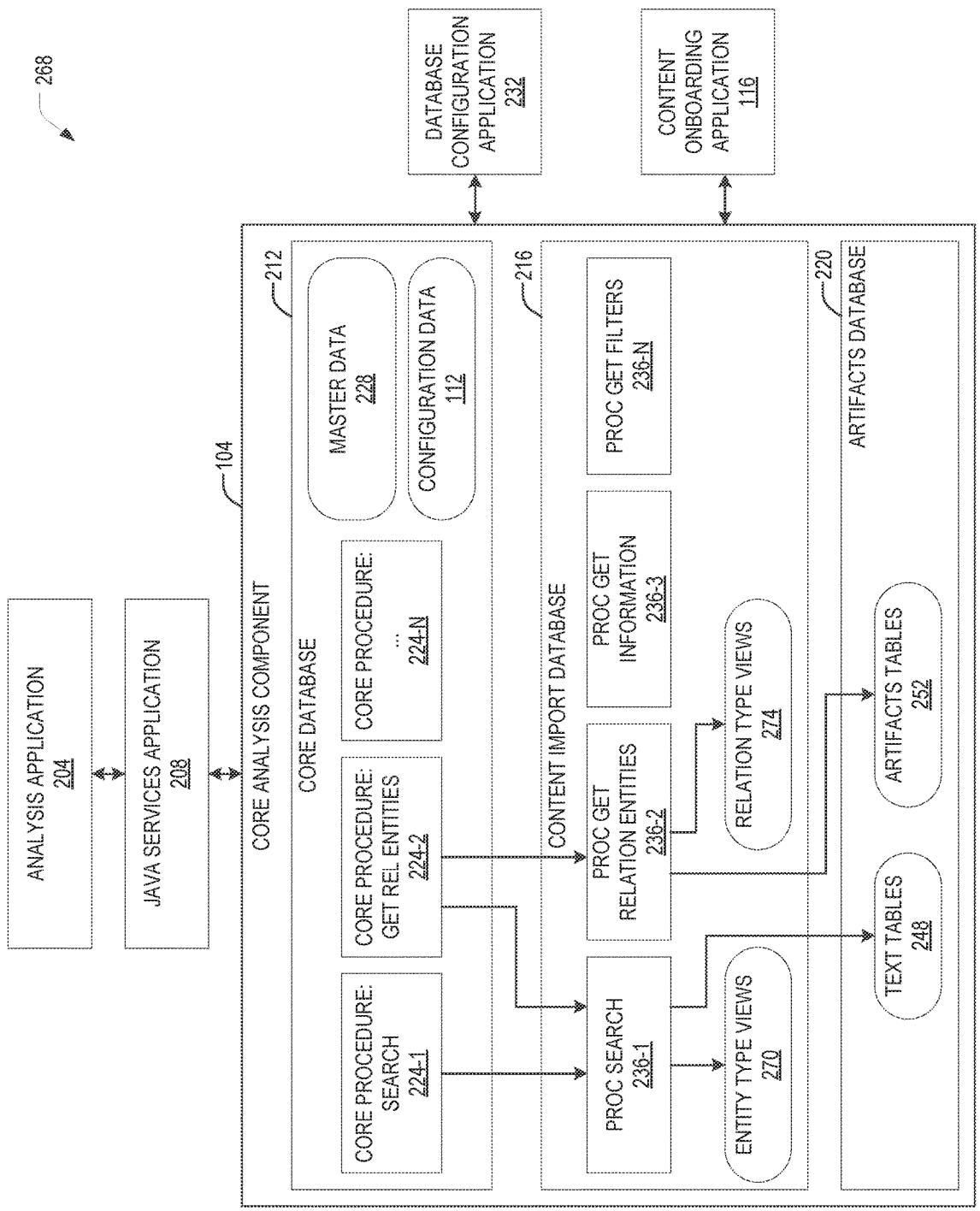
FIG. 2B is a block diagram of a second example data analysis system for importing and analyzing the content, in accordance with an example embodiment.

FIG. 2B is a block diagram of a second example data analysis system 268 for importing and analyzing the content 124, in accordance with an example embodiment. The elements of FIG. 2B are the same as the elements of FIG. 2A, except the stored procedures 236 are not content-specific and the entity type tables 240 and relation type tables 244 have been replaced with entity type views 270 and relation type views 274, respectively. The entity type view 270 and the relation type view 274 enable content stored in a variety of data structures (not shown), including data in a table format, to be accessed by the stored procedures 236 of the content import database 216. New views (e.g., the entity type view 270 and the relation type view 274) can be created for new entity types and new content 124. For example, icons representing the new entity types, labels for attributes, and the like may be defined in the configuration data 112 to create new entity types without further changing the stored procedures 236 of the content import database 216.

In the case where the data structure is a table in the format of the entity type tables 240 and the relation type tables 244, the entity type view 270 may be implemented as a join between, for example, the entity type tables 240 and the master node table; and the relation type view 274 may be implemented as a join between, for example, the master relation table and the relation type tables 244.

Figure 3:
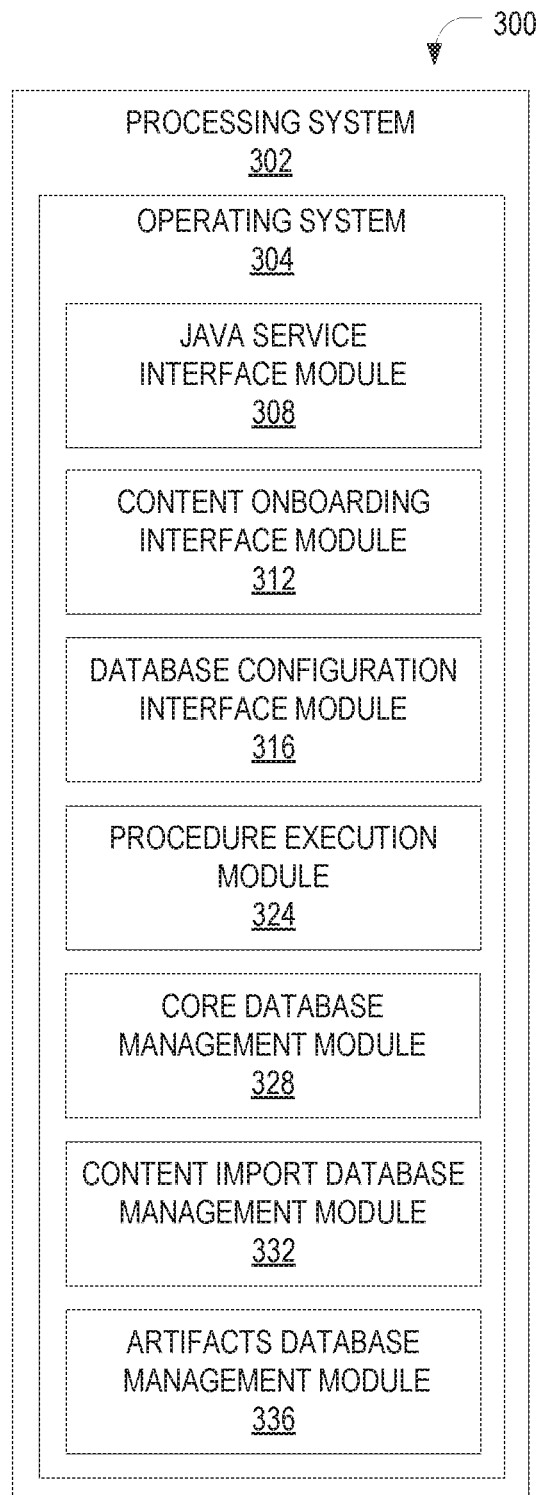
FIG. 3 is a block diagram of an example apparatus for implementing a core analysis component, in accordance with an example embodiment.

FIG. 3 is a block diagram of an example apparatus 300 for implementing the core analysis component 104, in accordance with an example embodiment. The apparatus 300 is shown to include a processing system 302 that may be implemented on a client or other processing device, and that includes an operating system 304 for executing software instructions. In accordance with an example embodiment, the apparatus 300 may include a Java service interface module 308, a content onboarding interface module 312, a database configuration interface module 316, a procedure execution module 324, a core module 328, a content-specific module 332, and an artifacts database management module 336.

The Java service interface module 308 provides an interface to the Java services application 208 for the core analysis component 104. The Java service interface module 308 receives, for example, calls to execute the stored core procedures 224 from the Java services application 208 and provides results of the execution of the stored core procedures 224, such as search results, to the Java services application 208.

The content onboarding interface module 312 provides an interface to the content onboarding application 116 and provides a conduit for replicating (importing) data from the physical source systems. The database configuration interface module 316 provides an interface to the database configuration application 232 for importing the master data 228 (including a master node table and a master relation table) and the configuration data 112 of the core analysis component 104.

The procedure execution module 324 executes the stored core procedures 224 in response to, for example, a call from the Java service interface module 308. The core module 328 manages, for example, the execution of the stored core procedures 224 by the procedure execution module 324 and manages the entity type tables 240 and the relation type tables 244.

The content-specific module 332 manages the replication of data from physical source systems via the content onboarding applications 116 and executes content-specific functionality, such as the stored procedures 236, on the content 124 stored in the entity type tables 240 and the relation type tables 244. The artifacts database management module 336 manages access to the text tables 248 and the artifacts tables 252.

FIG. 4 is a diagram of an example generic data model 400 and an example content-specific data model 450, in accordance with an example embodiment. The generic data model 400 includes a master node table 404 and a master relation table 408. The master node table 404 and the master relation table 408 contain the entity and relationship information, respectively, that is common to different logical source systems and different domains. For example, the master node table 404 may include an identification of the physical or logical source system, an identification of the type of entity (such as a person), an identification of the entity (such as the name of a person), a location defined by latitude and longitude, and a time associated with the entity (such as the time a person was at the specified location).

The master relation table 408 defines the relationships among the entities of the master node table 404. For example, an entry in the master relation table 408 may define the physical source system for an entity defined in the master node table 404.

The content-specific data model 450 includes the entity type tables 240-1, . . . , 240-N (collectively known herein as entity type tables 240) and relation type tables 244-1, . . . , 244-N (collectively known herein as relation type tables 244). The entity type tables 240 contain entities stored in the data analysis system 200 and the relation type tables 244 describe the relationships among the entities of the entity type tables 240. For example, the entity type table 240-1 may contain the first and last names of individuals, the entity type table 240-2 may contain the location of the individuals of the entity type table 240-1, and the entity type table 240-N may contain the citizenship of the individuals of the entity type table 240-1. The relation type table 244-1 may contain the relationships among the individuals of the entity type table 240-1.

Figure 5:
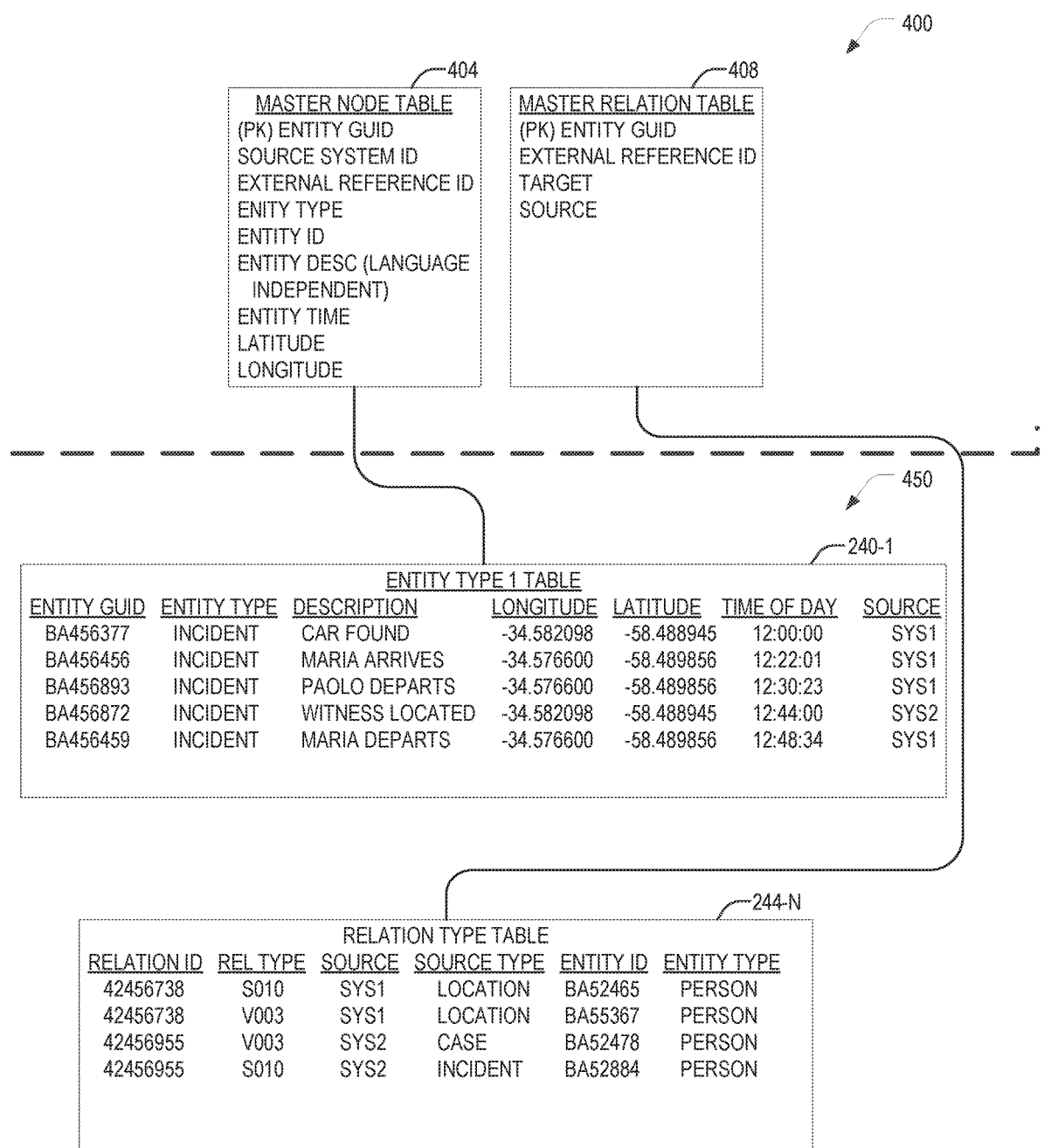
FIG. 5 is a diagram of an example generic data model and an example content-specific data model, in accordance with an example embodiment.

FIG. 5 is a diagram of an example generic data model 400 and an example content specific data model 450, in accordance with an example embodiment. Each row of the entity type table 240-1 comprises an entity identifier, an entity type (such as incident), a description (such as "car found"), a longitude and latitude associated with the entity, a time of day associated with the entity, and an identification of the source system associated with the entity (such as SYS1). Each row of the relation type table 244-N comprises a relation identifier, a relation type, an identification of the source system associated with the relation (such as SYS1), a source type associated with the entity (such as location), an entity identifier, and an entity type.

Figure 6:
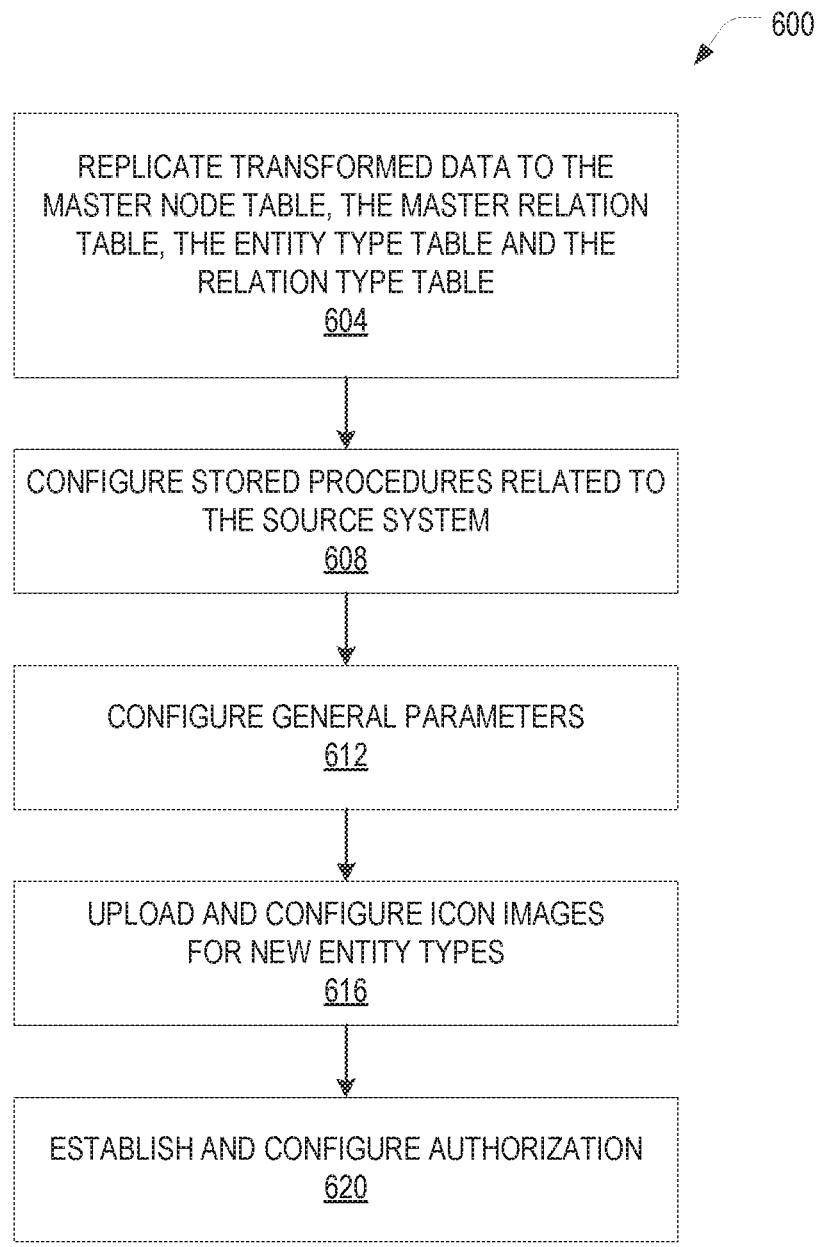
FIG. 6 is a flowchart for an example method for configuring the data analysis system, in accordance with an example embodiment.

FIG. 6 is a flowchart for an example method 600 for configuring the data analysis system 200, 268, in accordance with an example embodiment. The operations of the method 600 may be performed by the database configuration application 232, the core analysis component 104, and the content onboarding application 116.

In one example embodiment, the data obtained from a physical source system is transformed to conform to the content-specific model of the corresponding content onboarding application 116 and is replicated to the master node table 404, the master relation table 408, the entity type tables 240, and the relation type tables 244 (operation 604). The stored content-specific procedures 236 are configured by the database configuration application 232 based on the context of the logical system, e.g., based on the domain of the logical system (operation 608). The configuration information may, for example, identify the name of the procedure search 236-1, the name of the procedure get relation entities 236-2, the name of the procedure get information 236-3, and the name of the procedure get filters 236-N.

General parameters, such as the default zoom level for the user interface, the default geo-location of a user or user device, and the like, are configured (operation 612). The icon images for representing new entity types in the user interface are uploaded and configured (operation 616). For example, the icons of FIG. 1A may be uploaded and configured during operation 616. Authorization criteria for providing the content 124 to each user is established and configured (operation 620). In one example embodiment, the authorization criteria define which data may be accessed by or displayed to each user of the logical source system.

Figure 7A:
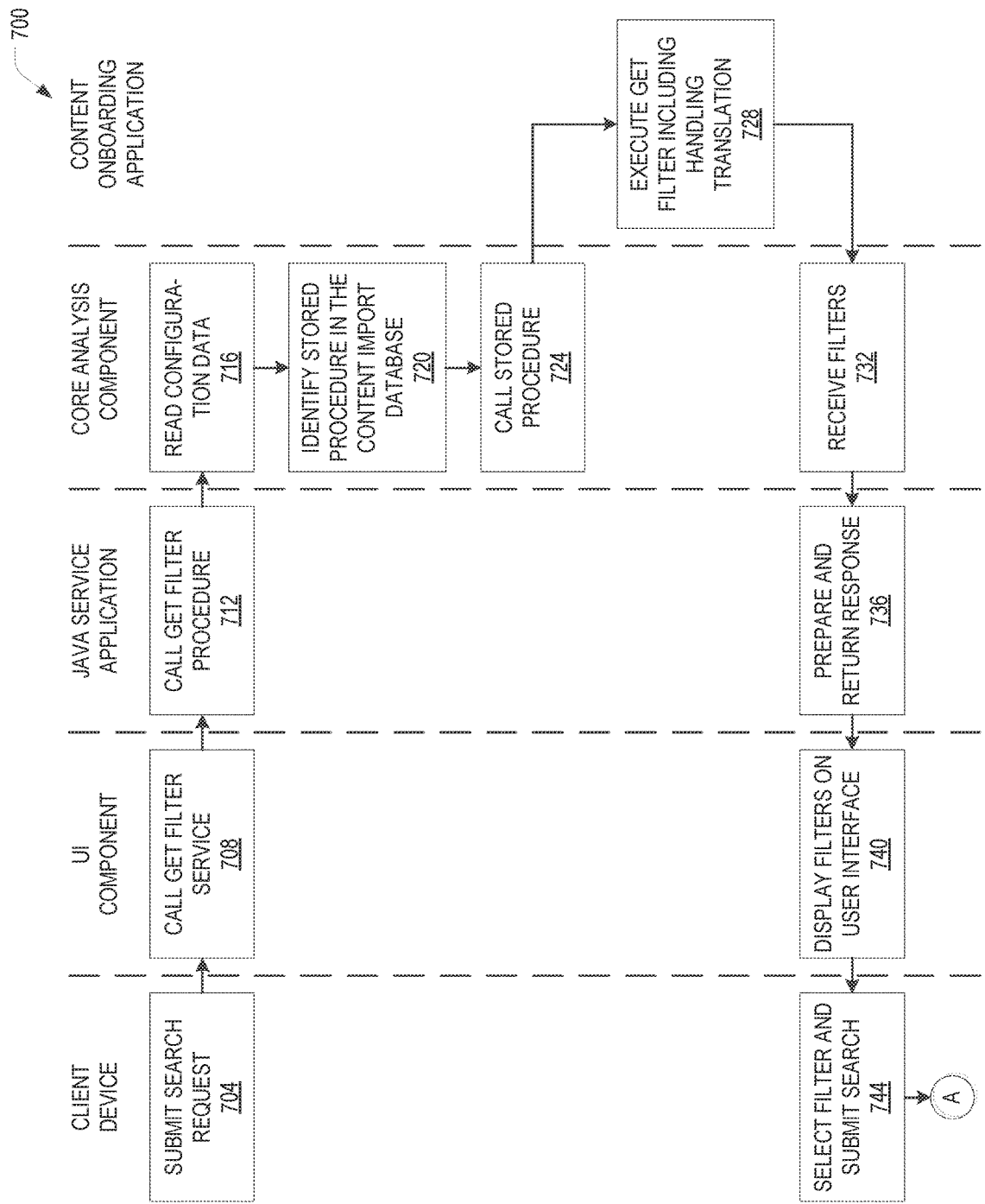
FIGS. 7A and 7B are a flowchart for an example method for performing a search in the data analysis system, in accordance with an example embodiment.
Figure 7B:
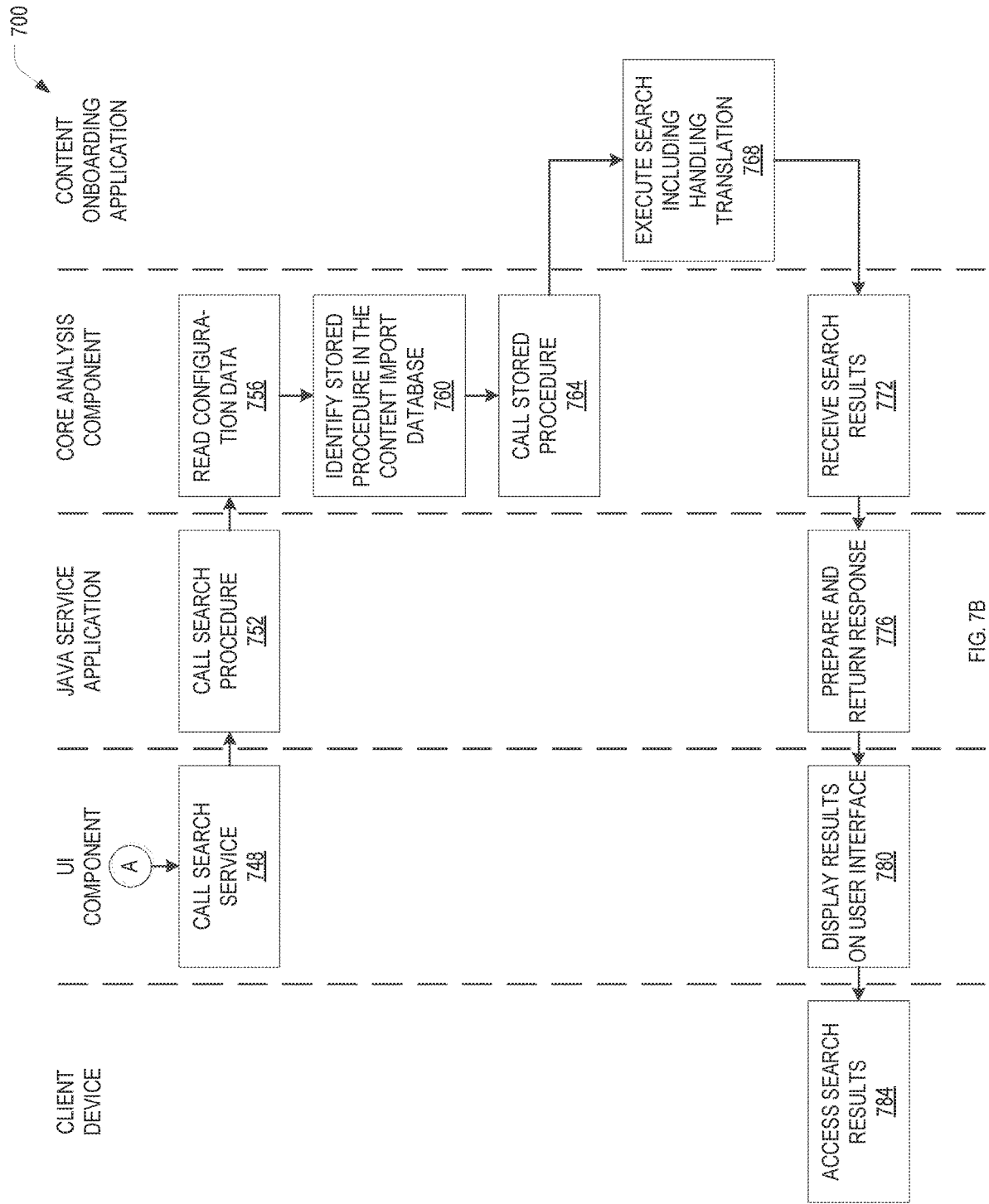

FIGS. 7A and 7B are a flowchart for an example method 700 for performing a search in the data analysis system 200, 268, in accordance with an example embodiment. The operations of the method 700 may be performed by the analysis application 204, the Java services application 208, the core analysis component 104, and the content onboarding application 116.

In one example embodiment, a user submits a request to conduct a search via a search user interface on, for example, a client device (operation 704). A user interface component of the analysis application 204 executes a call to the Java services application 208 to initiate a get filter service of the core analysis component 104 in order to determine the filtering mechanisms that are available to perform the search (operation 708). In response, the Java services application 208 executes a call to the core database 212 to execute the stored get filter procedure (not shown) (operation 712). The core analysis component 104 executes the stored get filter procedure, including reading the configuration data 112 (operation 716), identifying (based on the configuration data 112 and the get filter call) the corresponding stored procedure (the stored procedure get filters 236-N) of the content import database 216 (operation 720), and executing a call to the content onboarding application 116 for execution of the stored procedure get filters 236-N (operation 724). The content onboarding application 116 executes the stored procedure get filters 236-N, including handling language translation (if necessary) and returning the identification of the available filters to the core analysis component 104 (operation 728). The core analysis component 104 returns the identification of the filters to the Java services application 208 (operation 732) and the Java services application 208 prepares and returns the identification of the filters to the user interface component of the analysis application 204 (operation 736).

The user interface component of the analysis application 204 displays the identification of the available filters via the search user interface on the client device (operation 740). The user selects one or more of the displayed filters, enters the search terms into a search text field of the user interface (such as a search for all individuals connected to an identified criminal event), and submits the search via the user interface component of the analysis application 204 (operation 744). The analysis application 204 executes a call to the Java services application 208 to initiate execution of a search service of the core analysis component 104 (operation 748).

In response, the Java services application 208 executes a call to the core database 212 to execute the stored search procedure 224-1 (operation 752). The core analysis component 104 executes the stored search procedure 224-1, including reading the configuration data 112 (operation 756), identifying (based on the configuration data 112 and the search call) the corresponding stored procedure (stored procedure search 236-1) of the content import database 216 (operation 760), and executing a call to the content onboarding application 116 to execute the stored procedure search 236-1 (operation 764). The content onboarding application 116 executes the stored procedure search 236-1, including handling language translation (if necessary) and returning the search results to the core analysis component 104 (operation 768). The core analysis component 104 returns the search results to the Java services application 208 (operation 772) and the Java services application 208 prepares and returns the search results to the user interface component of the analysis application 204 (operation 776). For example, the Java services application 208 may prepare a JavaScript Object Notification (JSON) string for the user interface component of the analysis application 204. The user interface component of the analysis application 204 displays the search results via the user interface on the client device (operation 780). The search results may then be accessed by the user via the client device (operation 784).

Figure 8:
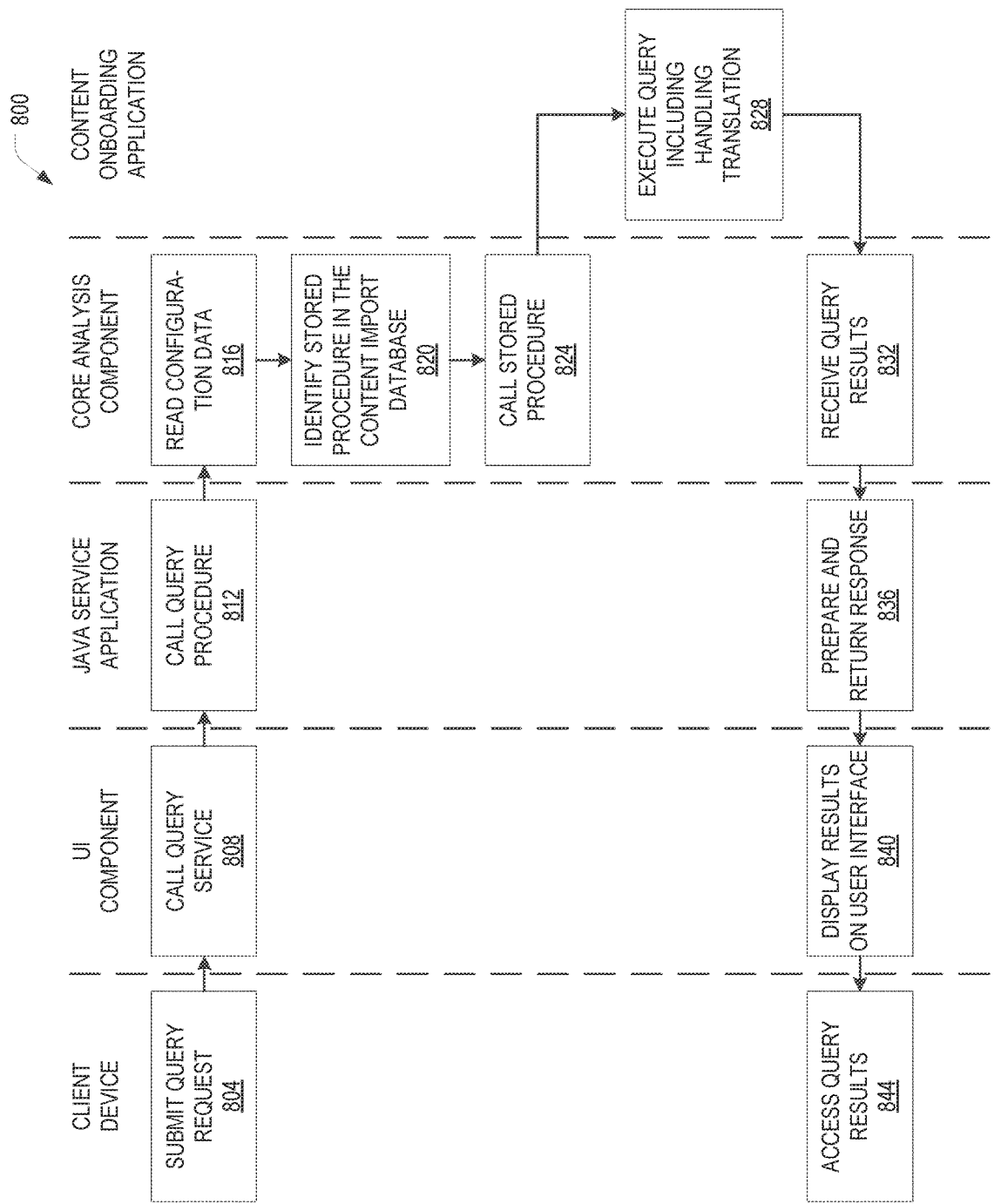
FIG. 8 is a flowchart for an example method for performing a query in the data analysis system, in accordance with an example embodiment.

FIG. 8 is a flowchart for an example method 800 for performing a query in the data analysis system 200, 268, in accordance with an example embodiment. The operations of the method 800 may be performed by the analysis application 204, the Java services application 208, the core analysis component 104, and the content onboarding application 116.

In one example embodiment, a user submits a query via a query user interface on, for example, a client device (operation 804). A user interface component of the analysis application 204 executes a call to the Java services application 208 to initiate execution of a query service of the core analysis component 104 (operation 808). In response, the Java services application 208 executes a call to the core database 212 to execute the stored procedure query (not shown) (operation 812). The core analysis component 104 executes the stored procedure query, including reading the configuration data 112 (operation 816), identifying (based on the configuration data 112 and the query call) the corresponding stored procedure query (not shown) of the content import database 216 (operation 820), and executing a call to the content onboarding application 116 to initiate execution of the stored procedure query (operation 824). The content onboarding application 116 executes the stored procedure query, including handling language translation (if necessary) and returning the query results to the core analysis component 104 (operation 828). The core analysis component 104 returns the query results to the Java services application 208 (operation 832) and the Java services application 208 prepares and returns the query results to the user interface component of the analysis application 204 (operation 836). The user interface component of the analysis application 204 displays the query results via the query user interface on the client device (operation 840). The query results may then be accessed by a user via the client device (operation 844).

EXAMPLES

In one example embodiment, a database system for processing information comprises a core database, the core database comprising at least one hardware processor and comprising one or more common procedures for processing the information, at least one of the common procedures configured to provide a common functionality to an analysis application; and a content import database, comprising the at least one hardware processor and comprising one or more content-specific procedures, at least one of the content-specific procedures configured to provide access for at least one of the common procedures to content of the content import database that conforms to a content-specific data model.

The database system may further comprise a content onboarding application for importing the content to the content import database. The importing operation may comprise transforming data obtained from one or more physical source systems to conform to the content-specific data model. In one example embodiment, at least one of the content-specific procedures is configured based on a context of a logical system. In one example embodiment, the content conforming to the content-specific data model is mapped to a generic content model of the core database. In one example embodiment, the common functionality is mapped to functionality of at least one of the content-specific procedures. In one example embodiment, the content-specific procedures utilize the content-specific data model and a generic data model to implement a content behavior. In one example embodiment, an element of the content is stored in an entity type table of the content import database and an entry in a relation type table describes a relation between two or more elements of the entity type table.

In one example embodiment, an element of the content is accessed via an entity type view of the content import database and a description of a relation between two or more elements of the entity type view is accessed via a relation type view defined by configuration data. In one example embodiment, a logical source system identifier identifies a mapping of data of a physical source system to a selected content-specific model during the importation of data from the physical source system to the content import database. In one example embodiment, each logical system of a plurality logical systems integrates content together from one or more physical source systems. In one example embodiment, each logical system uses a corresponding content-specific data model. In one example embodiment, the entity type view is one of a plurality of available entity type views and an entity type view is selected to access the content based on a selection of a logical system.

In one example embodiment, a computerized method for processing information comprises processing the information using one or more common procedures of a core database, the core database comprising at least one hardware processor, at least one of the common procedures configured to provide a common functionality to an analysis application; and providing, using at least one content-specific procedure of a content import database, access for at least one of the common procedures to content of the content import database that conforms to a content-specific data model.

Figure 9:
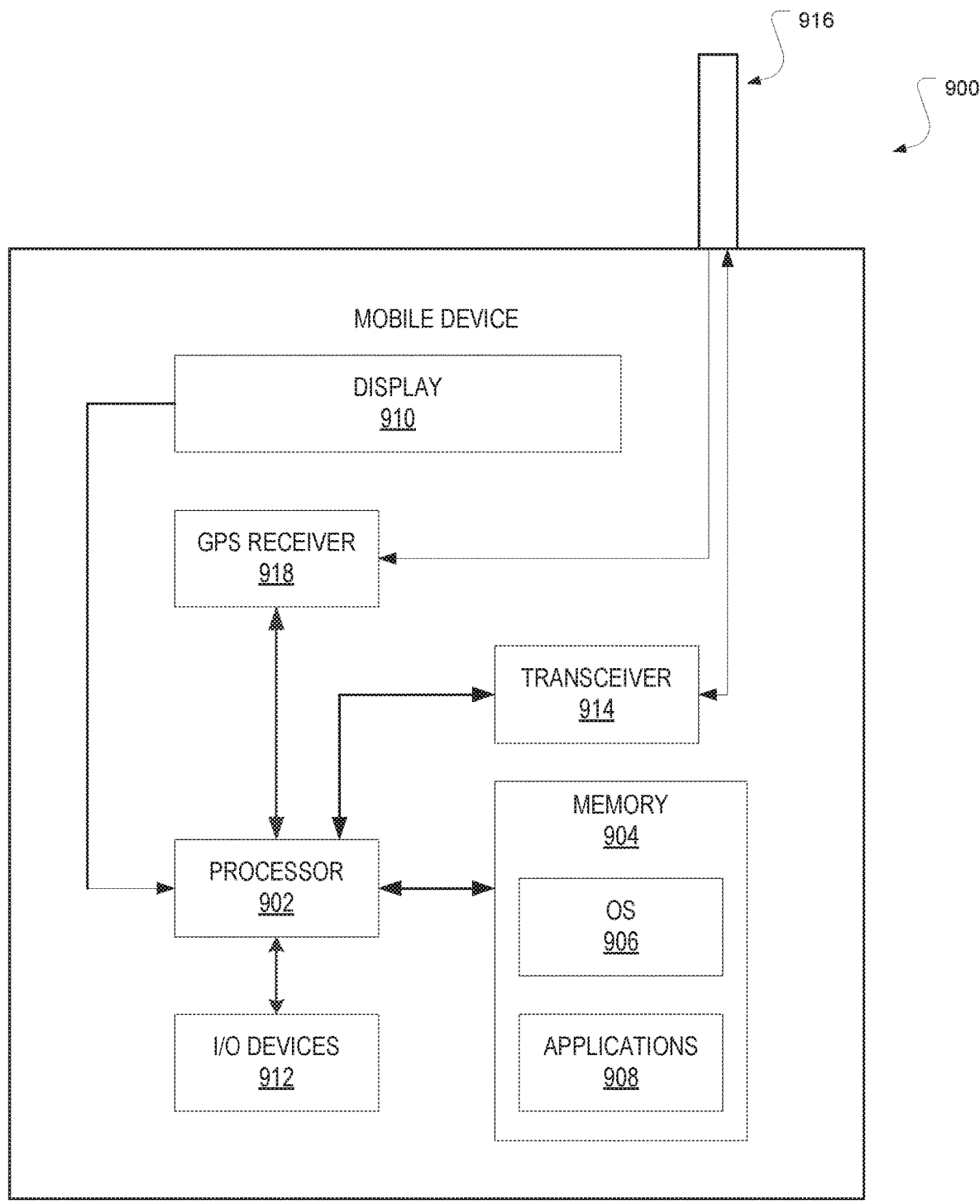
FIG. 9 is a block diagram illustrating a mobile device, according to an example embodiment.

FIG. 9 is a block diagram illustrating a mobile device 900, according to an example embodiment. The mobile device 900 can include a processor 902. The processor 902 can be any of a variety of different types of commercially available processors suitable for mobile devices 900 (for example, an XScale architecture microprocessor, a microprocessor without interlocked pipeline stages (MIPS) architecture processor, or another type of processor). A memory 904, such as a random access memory (RAM), a flash memory, or another type of memory, is typically accessible to the processor 902. The memory 904 can be adapted to store an operating system (OS) 906, as well as applications 908, such as a mobile location-enabled application that can provide location-based services (LBSs) to a user. The processor 902 can be coupled, either directly or via appropriate intermediary hardware, to a display 910 and to one or more input/output (I/O) devices 912, such as a keypad, a touch panel sensor, and a microphone. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a global positioning system (GPS) receiver 918 can also make use of the antenna 916 to receive GPS signals.

Figure 10:
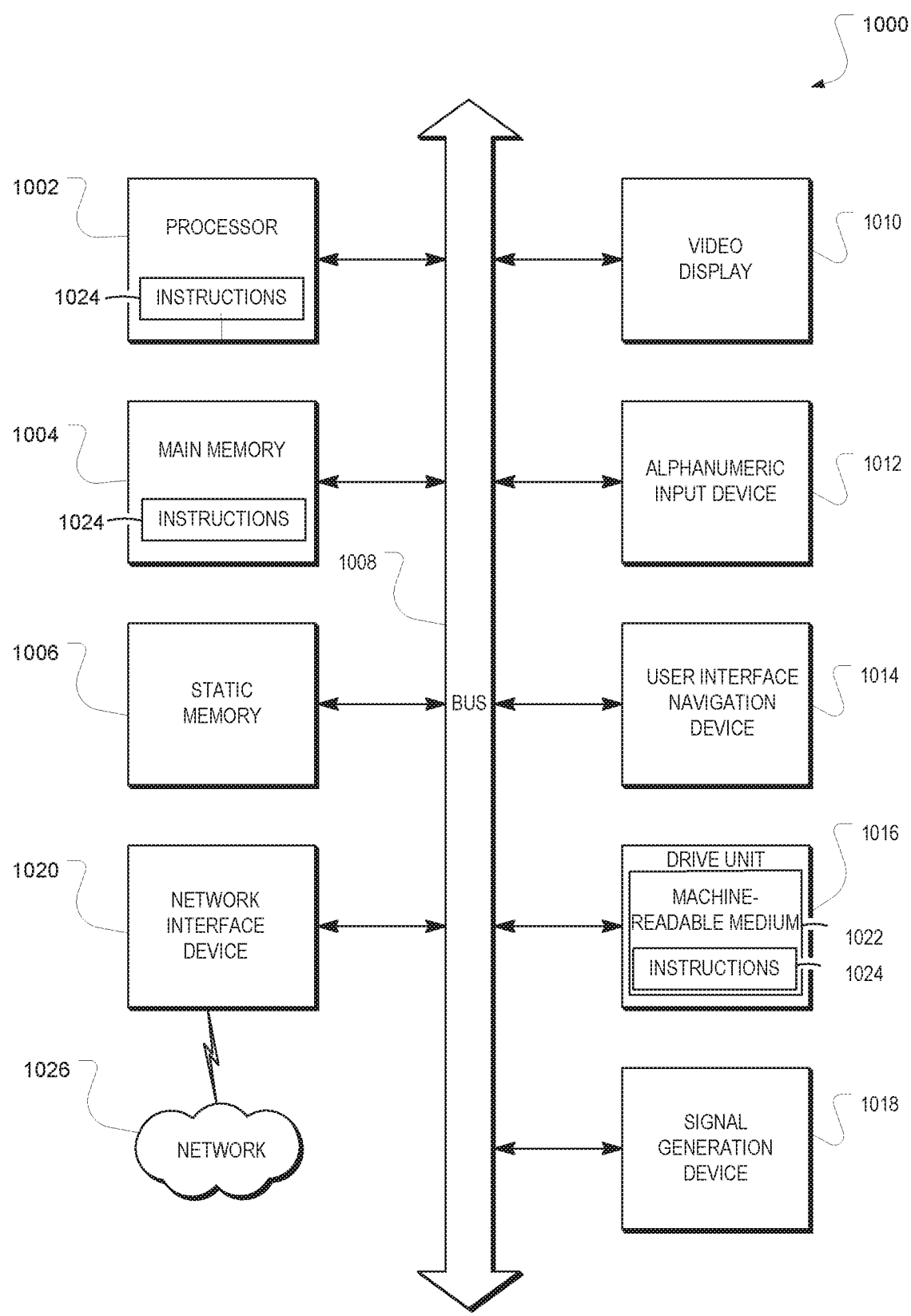
FIG. 10 is a block diagram of a computer processing system within which a set of instructions may be executed for causing a computer to perform any one or more of the methodologies discussed herein.

FIG. 10 is a block diagram of a computer processing system 1000 within which a set of instructions 1024 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed as software-as-a-service (SaaS), by an application service provider (ASP), or by utility computing providers. The computer may be a server computer, a personal computer (PC), a tablet PC, a personal digital assistant (PDA), a cellular telephone, or any processing device capable of executing a set of instructions 1024 (sequential or otherwise) that specify actions to be taken by that device. Further, while only a single computer is illustrated, the term "computer" shall also be taken to include any collection of computers that, individually or jointly, execute a set (or multiple sets) of instructions 1024 to perform any one or more of the methodologies discussed herein.

The example computer processing system 1000 includes a processor 1002 (e.g., a central processing unit (CPU), a graphics processing unit (GPU), or both), a main memory 1004, and a static memory 1006, which communicate with each other via a bus 1008. The computer processing system 1000 may further include a video display 1010 (e.g., a plasma display, a liquid crystal display (LCD), or a cathode ray tube (CRT)). The computer processing system 1000 also includes an alphanumeric input device 1012 (e.g., a keyboard), a user interface navigation device 1014 (e.g., a mouse and/or touch screen), a drive unit 1016, a signal generation device 1018 (e.g., a speaker), and a network interface device 1020.

The drive unit 1016 includes a machine-readable medium 1022 on which is stored one or more sets of instructions 1024 and data structures embodying or utilized by any one or more of the methodologies or functions described herein. The instructions 1024 may also reside, completely or at least partially, within the main memory 1004, the static memory 1006, and/or the processor 1002 during execution thereof by the computer processing system 1000, the main memory 1004, the static memory 1006, and the processor 1002 also constituting tangible machine-readable media 1022.

The instructions 1024 may further be transmitted or received over a network 1026 via the network interface device 1020 utilizing any one of a number of well-known transfer protocols (e.g., Hypertext Transfer Protocol (HTTP)).

While the machine-readable medium 1022 is shown, in an example embodiment, to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any medium that is capable of storing, encoding, or carrying a set of instructions 1024 for execution by the computer and that cause the computer to perform any one or more of the methodologies of the present application, or that is capable of storing, encoding, or carrying data structures utilized by or associated with such a set of instructions 1024. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between or among data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A database system for processing information, the database system comprising:
    at least one hardware processor;
    a core database comprising
        one or more common procedures for processing the information, at least one of the common procedures configured to provide a common functionality to an analysis application;
        configuration data that maps at least a portion of the one or more common procedures to corresponding content-specific procedures;
    a content import database comprising one or more content-specific procedures, at least one of the content-specific procedures configured to provide access for at least one of the common procedures to content of the content import database that conforms to a content-specific data model;
    the at least one hardware processor being programmed to perform operations comprising:
        receiving, by a services application and from the analysis application, a call to execute a first service on first content;
        responsive to the call from the analysis application, calling, by the services application, a first common procedure of the one or more common procedures of the core database to identify a first content-specific procedure of the content import database that corresponds to the first service using the configuration data;
        importing the first content, by a content-onboarding application;
        after importing the first content, executing, by the content-onboarding application, the first content-specific procedure on the first content to perform the first service on the first content;
        receiving, from the content-onboarding application, a result of the executing of the first content-specific procedure; and
        returning the result to the analysis application.

2. The database system of claim 1, further comprising a content onboarding application for importing the content to the content import database.

3. The database system of claim 2, wherein the importing the content comprises transforming data obtained from one or more physical source systems to conform to the content-specific data model.

4. The database system of claim 1, wherein at least one of the content-specific procedures is configured based on a context of a logical system.

5. The database system of claim 1, wherein the content conforming to the content-specific data model is mapped to a generic content model of the core database.

6. The database system of claim 1, wherein the content-specific procedures utilize the content-specific data model and a generic data model to implement a content behavior.

7. The database system of claim 1, wherein an element of the content is stored in an entity type table of the content import database and an entry in a relation type table describes a relation between two or more elements of the entity type table.

8. The database system of claim 1, wherein an element of the content is accessed via an entity type view of the content import database and a description of a relation between two or more elements of the entity type view is accessed via a relation type view defined by configuration data.

9. The database system of claim 8, wherein the entity type view is one of a plurality of available entity type views and wherein an entity type view is selected to access the content based on a selection of a logical system.

10. The database system of claim 1, wherein a logical source system identifier identifies a mapping of data of a physical source system to a selected content-specific model during the importation of data from the physical source system to the content import database.

11. The database system of claim 1, further comprising a plurality of logical systems, wherein each logical system integrates content together from one or more physical source systems.

12. The database system of claim 11, wherein each logical system uses a corresponding content-specific data model.

13. The machine-readable storage medium of claim 1, wherein the operations further comprise storing an element of the content in an entity type table of the content import database and an entry in a relation type table describes a relation between two or more elements of the entity type table.

14. The machine-readable storage medium of claim 6, wherein the operations further comprise:
  accessing an element of the content via an entity type view of the content import database; and
  accessing a description of a relation between two or more elements of the entity type view via a relation type view defined by configuration data.

15. A computerized method for processing information, the method comprising:
  processing the information using one or more common procedures of a core database, the core database comprising configuration data that maps at least a portion of the one or more common procedures to corresponding content-specific procedures, at least one of the common procedures configured to provide a common functionality to an analysis application;
  providing, using at least one content-specific procedure of a content import database, access for at least one of the common procedures to content of the content import database that conforms to a content-specific data model;
  receiving, by a services application and from the analysis application, a call to execute a first service on first content;
  responsive to the call from the analysis application, executing calling, by the services application, a first common procedure of the one or more common procedures of the core database to identify a first content-specific procedure of the content import database that corresponds to the first service using the configuration data;
  importing the first content, by a content-onboarding application;
  after importing the first content, executing, by the content-onboarding application, the first content-specific procedure on the first content to perform the first service on the first content;
  receiving, from the content-onboarding application, a result of the executing of the first content-specific procedure; and
  returning the result to the analysis application.

16. The computerized method of claim 15, further comprising importing the content to the content import database.

17. The computerized method of claim 15, wherein the content-specific procedure is configured based on a context of a logical system.

18. The computerized method of claim 15, wherein the content conforming to the content-specific data model is mapped to a generic content model of the core database.

19. The computerized method of claim 15, wherein an element of the content is accessed via an entity type view of the content import database and a description of a relation between two or more elements of the entity type view is accessed via a relation type view defined by configuration data.

20. A non-transitory machine-readable storage medium comprising instructions, which when implemented by one or more machines, cause the one or more machines to perform operations comprising:
  processing information using one or more common procedures of a core database, the core database comprising configuration data that maps at least a portion of the common procedures to corresponding content-specific procedures, at least one of the common procedures configured to provide a common functionality to an analysis application;
  providing, using at least one content-specific procedure of a content import database, access for at least one of the common procedures to content of the content import database that conforms to a content-specific data model
  receiving, by a services application and from the analysis application, a call to execute a first service on first content;
  responsive to the call from the analysis application, calling, by the services application, a first common procedure of the one or more common procedures of the core database to identify a first content-specific procedure of the content import database that corresponds to the first service using the configuration data;
importing the first content by a content-onboarding application;
  after importing the first content executing, by the content-onboarding application, the first content-specific procedure on the first content to perform the first service on the first content; and
  receiving, from the content-onboarding application, a result of the executing of the first content-specific procedure; and
  returning the result to the analysis application.

* * * * *